(12) United States Patent
Bartenstein (10) Patent No.: US 10,934,690 B2
(45) Date of Patent: Mar. 2, 2021

(54) SYSTEM AND METHOD FOR FLUSHING A DRINKING WATER INSTALLATION

(71) Applicant: UPONOR INNOVATION AB, Virsbo (SE)

(72) Inventor: Paul Bartenstein, Westhausen (DE)

(73) Assignee: Uponor Innovation AB, Virsbo (SE)

( * ) Notice: Subject to any disclaimer, the term of this patent is extended or adjusted under 35 U.S.C. 154(b) by 402 days.

(21) Appl. No.: 15/447,195

(22) Filed: Mar. 2, 2017

(65) Prior Publication Data
US 2017/0254052 A1 Sep. 7, 2017

(30) Foreign Application Priority Data
Mar. 3, 2016 (DE) .................... 10 2016 103 833.4

(51) Int. Cl.
| | |
|---|---|
| *E03B 1/02* | (2006.01) |
| *E03B 7/07* | (2006.01) |
| *E03C 1/122* | (2006.01) |
| *E03B 1/04* | (2006.01) |
| *E03B 7/08* | (2006.01) |
| *G01K 13/02* | (2021.01) |

(52) U.S. Cl.
CPC .................. *E03B 1/04* (2013.01); *E03B 1/02* (2013.01); *E03B 7/07* (2013.01); *E03B 7/08* (2013.01); *E03C 1/122* (2013.01); *G01K 13/02* (2013.01)

(58) Field of Classification Search
CPC ... E03C 1/122; E03B 1/02; E03B 1/04; E03B 7/006; E03B 7/07; E03B 7/074
USPC ....................................................... 137/862
See application file for complete search history.

(56) References Cited

U.S. PATENT DOCUMENTS

| | | | | | |
|---|---|---|---|---|---|
| 6,170,514 | B1* | 1/2001 | Esmailzadeh | .......... | B01D 29/27 134/166 C |
| 7,178,739 | B2* | 2/2007 | Taylor | ..................... | E03B 7/006 236/46 R |
| 7,337,800 | B2* | 3/2008 | Palm | ....................... | C02F 1/02 137/238 |
| 9,151,023 | B2* | 10/2015 | Taylor | ...................... | E03B 7/08 |
| 2002/0157708 | A1* | 10/2002 | Goff | ....................... | E03B 7/006 137/238 |

(Continued)

FOREIGN PATENT DOCUMENTS

| | | | | |
|---|---|---|---|---|
| DE | 102006017807 | | 10/2007 | |
| DE | 102006017807 | A1 * | 10/2007 | ............. E03B 7/045 |

(Continued)

*Primary Examiner* — Seth W. Mackay-Smith (57) ABSTRACT

A system and method for flushing a drinking water installation, comprises at least one riser or distribution pipe, branch pipes connected to the riser or distribution pipe, as well as consumer devices and flushing stations connected to the branch pipes. The flushing stations have measuring devices for the temperature change in the branch pipe or the throughflow through the branch pipe, and/or measuring devices for the temperature change or the throughflow. The system includes and the method uses a control unit which is connected to the measuring devices by means of data cables or by radio. The control unit has an evaluation module for the data transmitted by the measuring devices, and the evaluation module is set up to determine, on the basis of the transmitted data, which flushing stations need to be flushed simultaneously in order for the riser or distribution pipe to be flushed.

15 Claims, 5 Drawing Sheets

(56) References Cited

U.S. PATENT DOCUMENTS

| | | | | |
|---|---|---|---|---|
| 2012/0048386 A1* | 3/2012 | Clark | ............... | E03B 7/00 |
| | | | | 137/2 |
| 2012/0204981 A1* | 8/2012 | Coerdt | ............... | E03B 7/04 |
| | | | | 137/563 |
| 2013/0306157 A1* | 11/2013 | Aylon | ............... | E03B 7/07 |
| | | | | 137/1 |
| 2014/0251379 A1* | 9/2014 | Mackenzie | ............... | A62C 35/58 |
| | | | | 134/18 |

FOREIGN PATENT DOCUMENTS

| | | |
|---|---|---|
| DE | 102010055176 | 7/2012 |
| DE | 202012102881 | 11/2012 |
| DE | 202012103128 | 1/2014 |
| EP | 2166159 A2 | 3/2010 |
| EP | 2466019 | 3/2010 |

\* cited by examiner

Group Flushing Configuration

| | | |
|---|---|---|
| Site | Uponor Site ▷ | |
| Section | Uponor Location ▷ | |
| Riser | SLV1 ▷ | |
| Common Group Flush Date | 27.01.2016 | |
| Common Group Flush Time | 12:00:00 ◁▷ | |
| Duration | 2 min ▷ | |
| Unit Type | ○ HOT ○ COLD ● HOT & COLD | |
| Frequency | ○ Once ○ Recurring | |
| Recurring Option | Every 20 Days ▷ | |

Add To Flushing Group

| ☐ Select A, B | Transmitter ID | Transmitter Name | Transmitter Category | Hub Id | Transmitter Type |
|---|---|---|---|---|---|
| ☐ | 900013 | PUMP 13 | Hot Water Pipe | 3456 | 7W ⟵ SS1 |
| ☐ | 900014 | 000014 | Hot Water Pipe | 3456 | 7W ⟵ SS2 |
| ☐ | 4930876 | VALUE KITCHEN | Cold Water Pipe | 3456 | 7W ⟵ SS3 |

KM

+ Add/Edit
⊙ Alerts
◯ Log Books
▭ Reports
▭ Analysis
⊗ Logout

SYSTEM AND METHOD FOR FLUSHING A DRINKING WATER INSTALLATION

RELATED APPLICATION

This application claims priority to German Application No. 102016103833.4 filed on Mar. 3, 2016, the contents of which are hereby incorporated by reference in their entirety.

FIELD OF INVENTION

The invention relates to a system and a method for flushing a drinking-water installation that comprises at least one riser or distribution pipe, a plurality of branch pipes connected to the riser or distribution pipe, and consumer devices and flushing stations connected to the branch pipes, wherein the flushing stations have measuring devices for the temperature change in the branch pipes or the throughflow through the branch pipe.

BACKGROUND

In a relatively large drinking water installation, as for example in a multi-story hotel, there is always the risk of some rooms being unoccupied for a relatively long time. As a result, drinking water may stand in these pipe sections for a long time.

If water stands for a relatively long time, bacteria, including *Legionella*, may develop. A guest who checks into a room following an extended lack of occupancy may therefore use contaminated water. This can cause health impairments.

It is conventional to provide in the sanitary installations flushing stations that contain measuring devices that ascertain whether the water has been standing for longer than, for example 72 hours. If this is the case, the flushing station automatically initiates flushing. This renews the water in the branch pipe in the sanitary area. The flushing stations ensure reliable flushing of the branch pipes.

Drinking-water installations in large buildings are complex. Such installations include risers or distribution pipes that have a larger diameter than the branch pipes. Similar stagnation of water can also occur in these pipes. This can result in the same problem: bacterial growth.

SUMMARY

An object of the invention is to promote reliable flushing of the entire drinking water installation, including the risers or distribution pipes.

In one aspect, the invention features a system for flushing a drinking water installation. Such a system includes at least one riser or distribution pipe, a plurality of branch pipes connected to the riser or distribution pipe, consumer devices and flushing stations connected to the branch pipes, and a control unit. The flushing stations have measuring devices that measure the temperature change in the branch pipe or the throughflow through the branch pipe. The control unit connects to the measuring devices via data cables or by radio. Within the control unit is an evaluation module for evaluating the data transmitted by the measuring devices. The evaluation module determines, based on the transmitted data, which flushing stations need to be flushed simultaneously to flush the riser or distribution pipe.

The invention uses the measuring devices integrated into the flushing stations and connects them via data cables or a wireless link to a central control unit. The central control unit ascertains, via an evaluation module, which riser or distribution pipe needs to be flushed. Since the measuring devices in the individual flushing stations sense the water throughflow, the evaluation module can calculate in which risers or distribution pipes too little water movement has taken place and in which pipes have an elevated risk of microbial growth.

Alternatively, or in addition, it is also possible to use measuring devices installed in the drinking-water installation independently of the flushing stations. Furthermore, the invention makes use of the fact that, through the simultaneous flushing of several flushing stations, the flow-rate of water in the riser or distribution pipe becomes high enough to become turbulent. This turbulent flow promotes reliable flushing of the riser or distribution pipe.

Many drinking-water installations have plural risers or distribution pipes for hot and cold water. These risers or distribution pipes are wider than the branch pipes in which the flushing stations are integrated. As a result, actuating a single flushing station results in only laminar flow in the riser or distribution pipe. This is insufficient to discourage microbial growth. To achieve the necessary turbulent flow, it is necessary to simultaneously flush a certain number of flushing stations that the flow in the riser or distribution pip.

Advantageously, each flushing station is assigned an ID, for example in the form of a serial number. The control unit can use this serial number to identify to which branch pipe and where in the system that flushing station is connected.

According to a preferred embodiment, the evaluation module in the control unit outputs a notification indicating which riser or distribution pipe needs to be flushed. This has the advantage that the facilities management is merely informed as to which riser or distribution pipe needs to be flushed and can carry out the flushing operation for the riser or distribution pipe at a time in which the users of the building are not disturbed.

For example, when many flushing stations are flushed simultaneously, the water pressure in the system can briefly drop. This means that there will be very low water pressure, particularly in the upper stories. This may disturb hotel guests. Therefore, it is advantageous for facilities management to initiate flushing at a time selected to disturb as few guests as possible.

According to a further preferred embodiment, the control unit comprises a configuration module that proposes which flushing station is to be flushed depending on the riser or distribution pipe to be flushed and via which it is possible to set at least one of the following parameters: flushing time, flushing duration, flushing for the hot-water pipe and/or cold-water pipe, and whether flushing needs to take place once or in a recurring manner.

The configuration module thus allows the facilities management to implement the notification output by the evaluation module for flushing a riser or distribution pipe, wherein certain settings can be made based on the above-mentioned parameters.

According to an alternative embodiment, the evaluation module initiates flushing of the riser or distribution pipe automatically by simultaneous flushing of the ascertained flushing stations.

According to a further preferred embodiment, the consumer devices are connected in the branch pipes via a serial and/or loop pipe system and the connection of the consumer devices to the serial and/or loop pipe system is realized via loop fittings. This not only brings about reliable flushing of the branch pipes via the flushing stations but also, in the event of simultaneous flushing of a plurality of flushing stations, promotes the turbulent flow in the riser or distribution pipe.

The invention also relates to a method for flushing a drinking-water installation, comprising at least one riser or distribution pipe, a plurality of branch pipes connected to the riser or distribution pipe, consumer devices and flushing stations connected to the branch pipes, and a control unit, wherein the flushing stations have measuring devices for the temperature change in the branch pipe or the throughflow through the branch pipes, and/or measuring devices for the temperature change or the throughflow are provided. The control unit connects to the measuring devices via data cables or via radio and receives data about throughflow through the branch pipes and/or risers or distribution pipes. The control unit has an evaluation module for the data transmitted from the flushing stations. This evaluation module determines, based on the transmitted data, which flushing stations need to be flushed simultaneously to properly flush the riser or distribution pipe.

Advantageously, the evaluation module outputs only a notification as to which riser or distribution pipe needs to be flushed. Preferably, the control unit comprises a configuration module that proposes which flushing station is to be flushed depending on the riser or distribution pipe to be flushed and via which the flushing station to be flushed can be selected manually. According to an alternative embodiment, the flushing of the riser or distribution pipe is initiated automatically by simultaneous flushing of flushing stations by the evaluation module.

Further advantageous configurations of the invention are disclosed in the dependent claims and the following description of the figures.

The invention is explained in more detail by way of an exemplary embodiment illustrated in the drawings.

DESCRIPTION OF THE DRAWINGS

FIGS. 1A and 1B, which when joined side-by-side as shown in the upper right of sheet 1, schematically shows a drinking water installation having ten flushing stations, FIG. 1, which is on the extreme upper right of the sheet, shows how FIGS. 1A and 1B are to be joined side-by-side, FIG. 2 schematically shows the networking of the flushing stations via a control unit.

In the following text, elements with the same function are provided with the same reference signs throughout the figures and not explained separately per figure.

DETAILED DESCRIPTION

Figures 1, 1A:
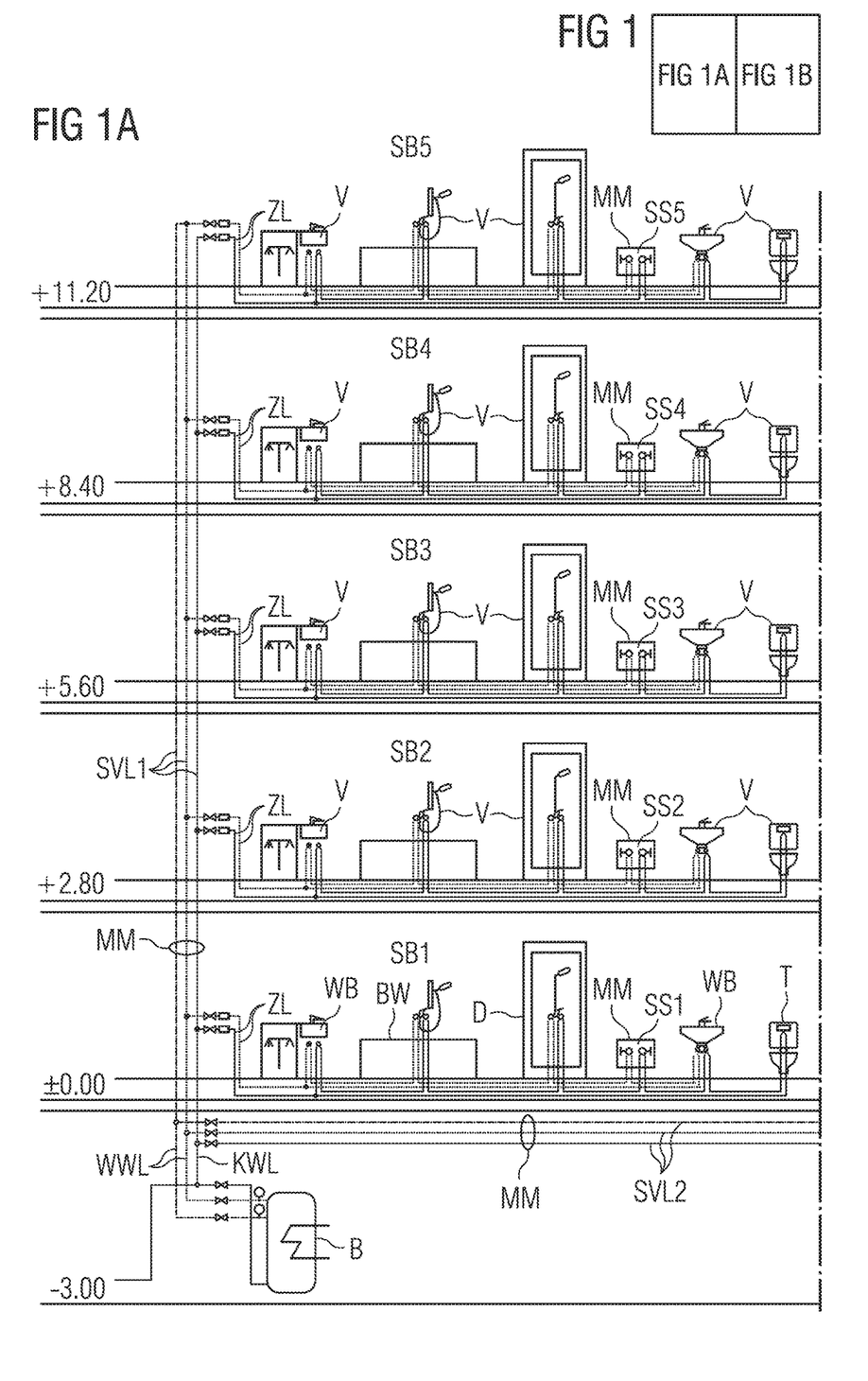
Figure 1B:
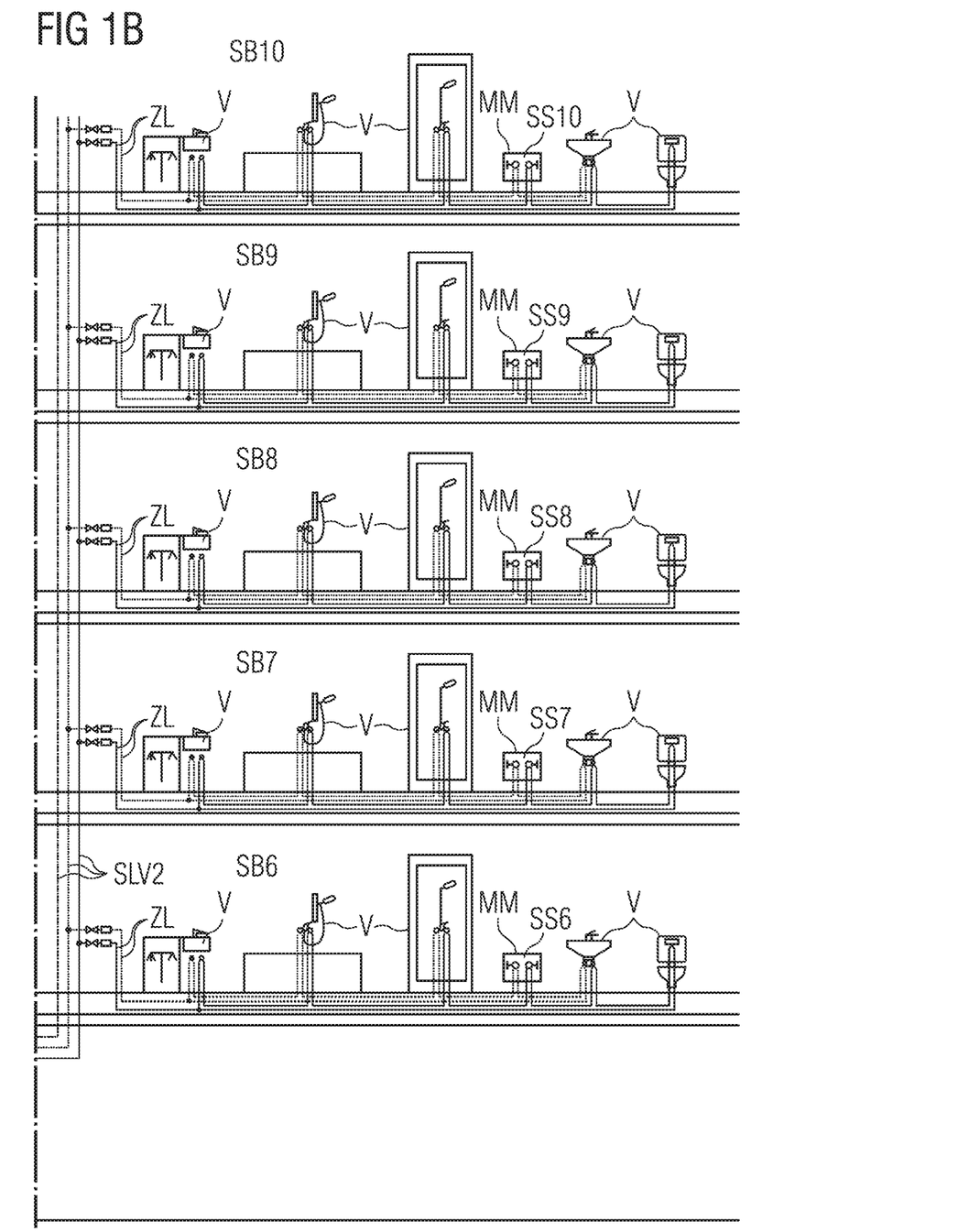

FIG. 1, which is a union of FIG. 1A and FIG. 1B joined side-by-side as shown in Sheet 1 of the drawings, shows a system for a drinking-water installation having ten different sanitary areas SB1-SB10. Such a drinking-water installation could be installed, for example, in a hotel. The sanitary areas SB1-SB6 are on the ground floor and the sanitary areas SB2-SB5 and SB7-SB10 are arranged on the first through fourth floors, respectively.

A boiler B in the basement heats water. A hot-water feed pipe WWL leads from the boiler B once to the sanitary areas SB1-SB10 (feed flow) and back therefrom to the boiler B again (return flow). Similarly, a cold-water feed pipe KWL leads from the basement to the sanitary areas SB1-SB10.

The hot and cold-water feed pipes WWL, KWL that lead to the sanitary areas SB1-SB10 are denoted risers or distribution pipes SVL in the main line. The sanitary areas SB1-SB5 are connected via the riser or distribution pipe SVL1. The sanitary areas SB6 to SB10 are connected via a riser or distribution pipe SVL2 that is initially laid horizontally in the basement and that then leads vertically from the basement to the fourth floor.

Branch pipes ZL lead from the risers or distribution pipes SVL1, SVL2 into the respective sanitary areas SB1-SB10. Consumer devices connect to the branch pipes ZL per sanitary area SB. In the illustrated embodiment, sanitary areas SB1-SB10 are a wash basin WB, a bathtub BW, a shower D, a further wash basin WB and, at the end, a toilet T. One flushing station SS1-SS10 is integrated per sanitary area SB1-SB10 between the shower D and the wash basin WB. In the sanitary areas SB2-SB10, the consumer-devices WB, BW, D, and T are denoted V, since they are presented only by way of example.

The consumer devices V are connected to the branch pipes ZL via a serial and/or loop pipe system. In such a system, that both the hot-water pipe and the cold-water pipe are laid via loop fittings at each consumer device V. As a result, no dead T pieces arise. Instead, when the toilet T is operated, for example in the entire serial and/or loop pipe system of the branch pipe ZL for the cold water, the cold water moves in the pipe past all the consumer devices V.

Figure 2:
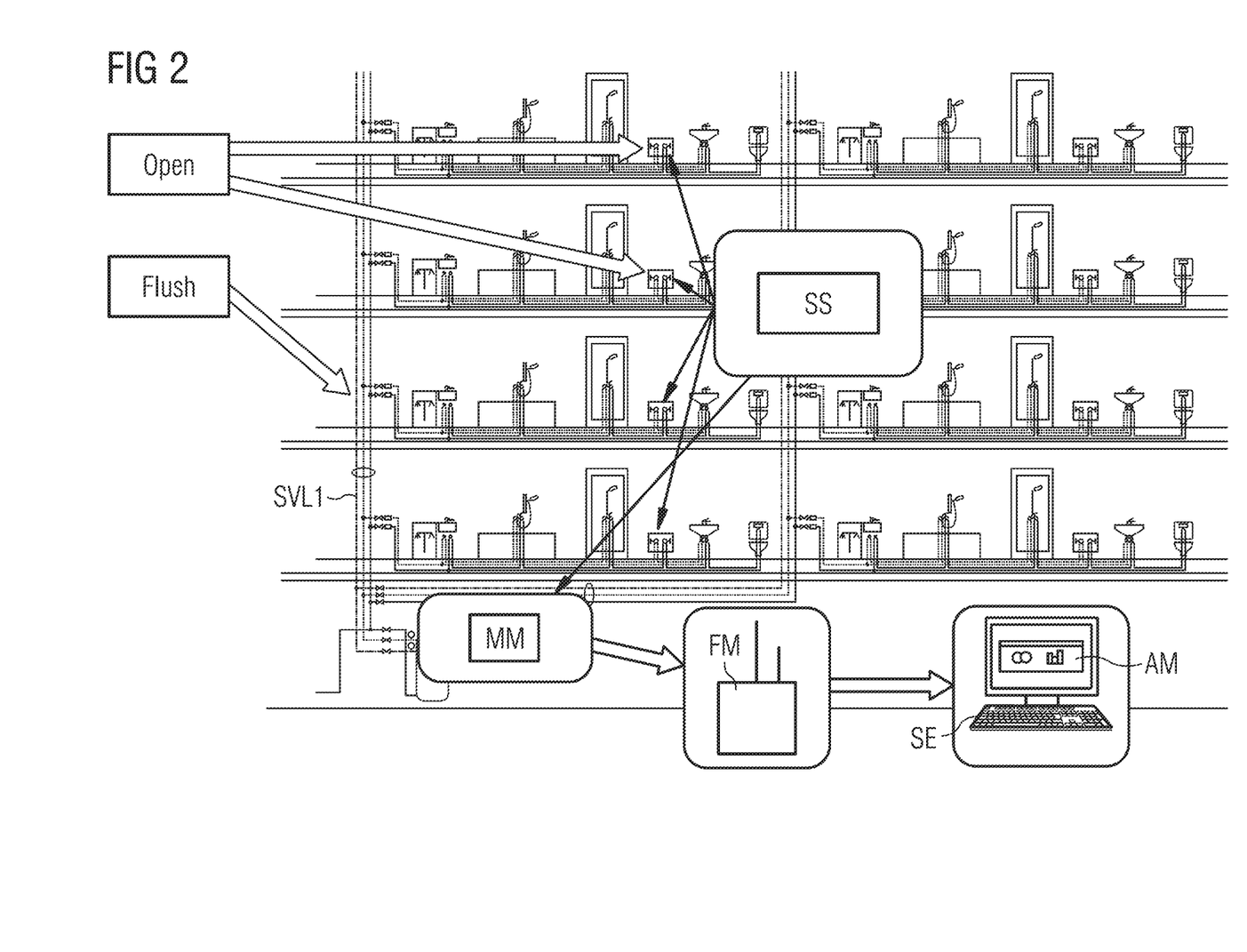

FIG. 2 shows a drinking-water installation according to FIG. 1 in which the flushing stations SS have been coupled to a control unit SE via a radio module FM. As a result, the control unit SE collects data indicative of how much water has been moved through the branch pipes ZL and whether a flushing station SS had to be actuated.

To provide this data, the flushing stations SS have measuring devices MM. The measuring devices MM determine the throughflow of drinking water through the hot-water pipe and through the cold-water pipe via temperature changes or a throughflow meter. The measuring devices MM then pass this information on to the control unit SE via the radio module.

Alternatively, or in addition, it is also possible to use measuring devices MM installed in the drinking-water installation independently of the flushing stations. Examples of such measuring devices MM are those in the risers and distribution pipes SVL1 and SVL2. It is likewise possible to connect all the flushing stations SS and measuring devices MM to the control unit SE via laid data cables.

The control unit SE has an evaluation module AM that determines, based on the received data from the measuring devices MM in the flushing stations SS, whether a riser or distribution pipe SVL, for example the riser or distribution pipe SVL1 in FIG. 1, must be flushed. This is the case, for example, when the flushing stations SS1-SS5 have been triggered frequently in the sanitary areas SB1-SB5 because the water in the sanitary areas has been standing too long.

Actuating a single flushing station does not, however, result in turbulent flow in the riser or distribution pipe SVL1. This means that there is also a risk of microbial growth in the riser or distribution pipe SVL1. If this is ascertained by the evaluation module AE in the control unit SE, the control unit SE outputs a notification indicating that a particular riser, or a particular distribution pipe, for example SVL1, needs flushing.

Figure 3:
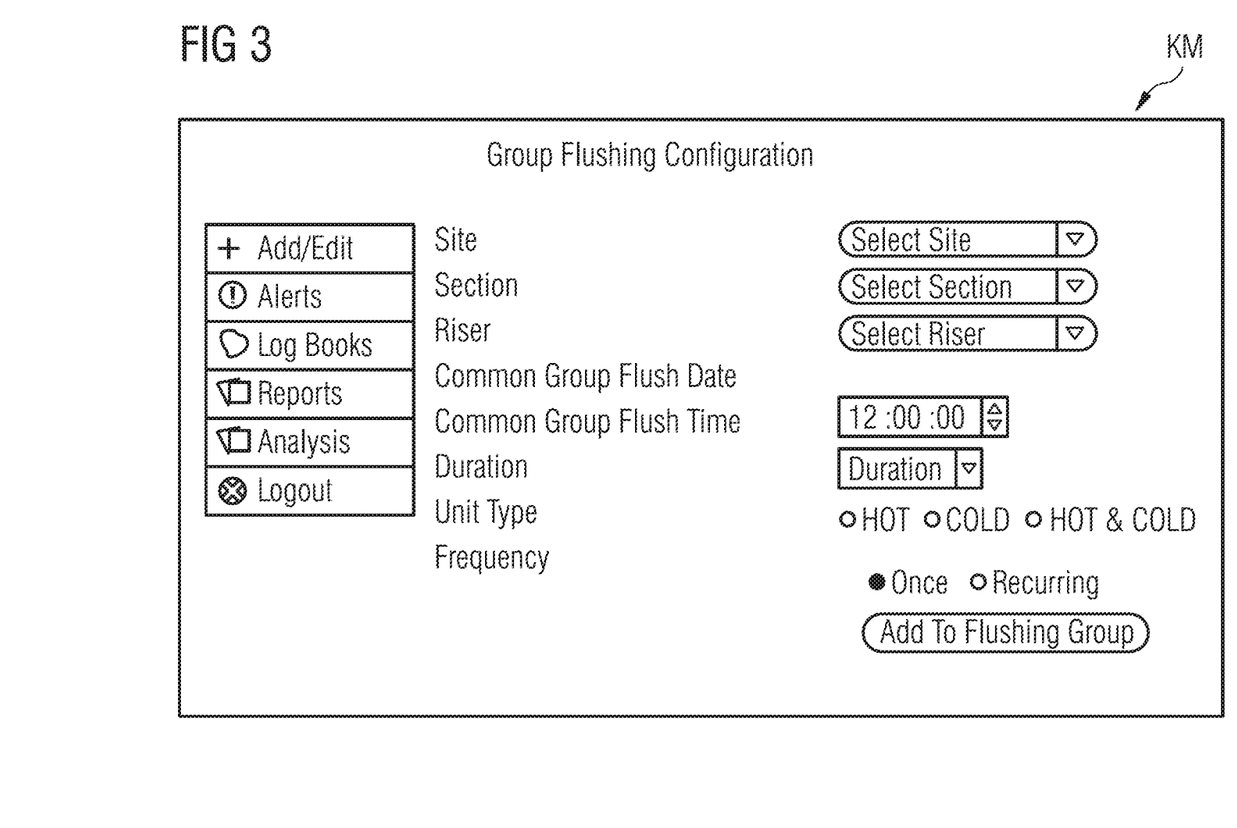
FIG. 3 shows a configuration module of the control unit.

To this end, the control unit SE preferably has a configuration module KM, as illustrated in FIG. 3. In the configuration module, the building can be selected in the menu item "Site," the building section can be selected in the menu item "Section" and the corresponding riser or distribution pipe can be selected in the menu item "Riser." In the further menu item "Common Group Flush Time," it is possible to set when flushing should take place. The menu item "Duration" makes it possible to set the flushing duration. Using the menu items "Hot," "Cold," and "Hot & Cold," it is possible to set whether only the cold-water pipe, only the hot-water pipe or all the pipes should be flushed.

The menu item "Frequency" makes it possible to set whether flushing should take place once or in a recurring manner. If the person responsible, usually the facilities manager, receives, via the evaluation module AE, information indicating that a particular riser or distribution pipe SVL needs to be flushed, the configuration module KM allows selection of this riser or distribution pipe SVL.

Figure 4:
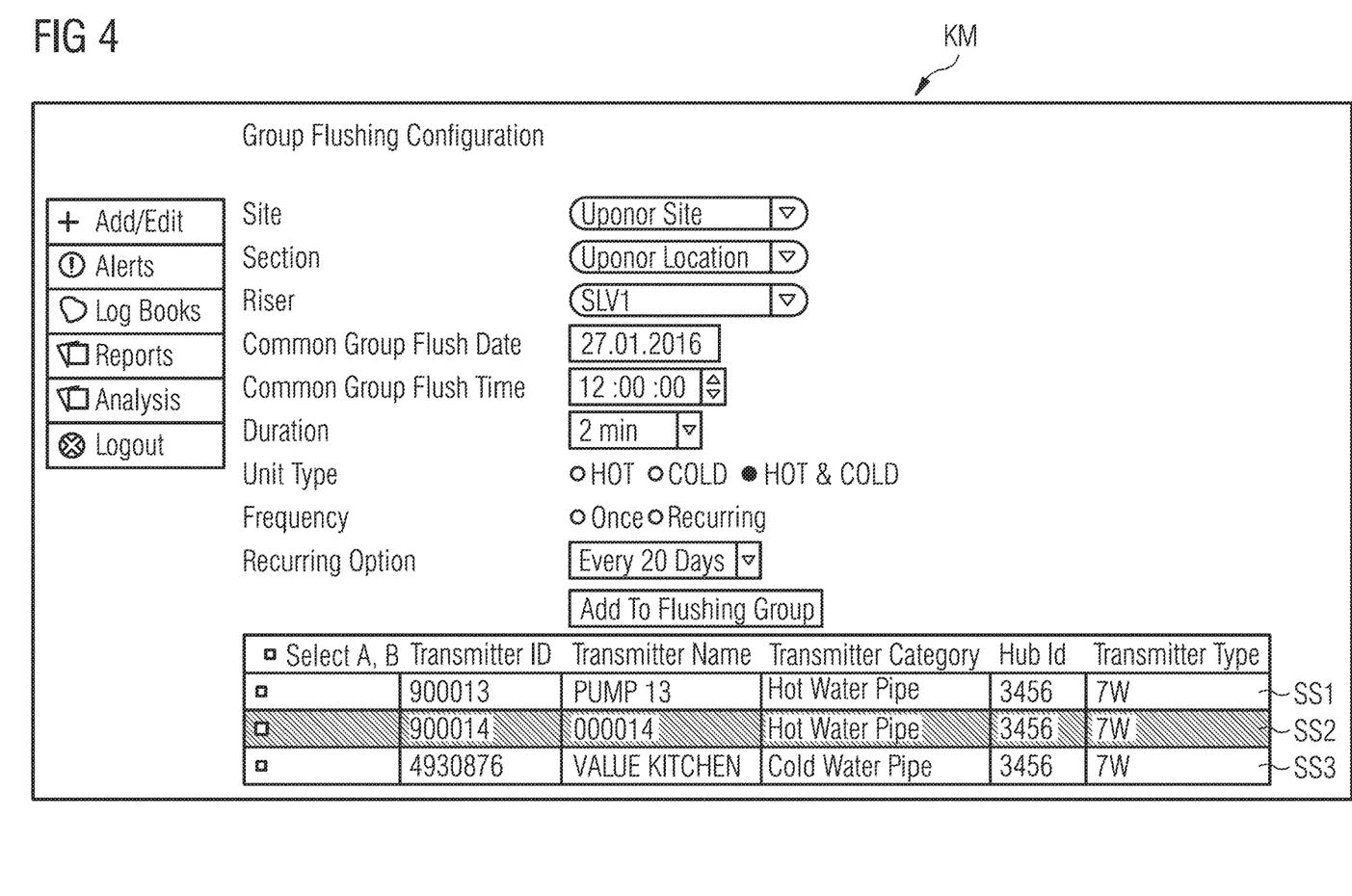
FIG. 4 shows the output of the configuration module following definition of the parameters.

In response to such selection, the configuration module KM proposes a certain number of flushing stations SS to the facilities manager, as shown in FIG. 4, there being three in the exemplary embodiment shown in FIG. 4. These are indicated as having to be flushed simultaneously to achieve reliable flushing of the riser or distribution pipe SVL1.

An advantage of setting via the configuration module is that the facilities management can incorporate its own experience with the system. As an example, the facilities management may use the configuration module KM primarily to set the flushing time to avoid disturbing any visitors to the sanitary areas. As another example, in multi-story buildings, when many flushing stations, for example SS1-SS5, are actuated simultaneously, a pressure drop occurs. This results in reduced water pressure or even no pressure at all the sanitary area SS5. The configuration module KM permits selecting the flushing time such that there is a low probability of the sanitary areas being used.

Alternatively, the evaluation module AE can also be set to automatically initiate flushing via the flushing stations SS.

The solution described herein drastically reduces the bacterial load in drinking-water installations and does so without requiring additional fixtures.

Because of the intelligent networking of the flushing stations SS and the simultaneous flushing of the flushing stations SS, a turbulent flow and necessary flushing in the risers or distribution pipes SVL is also achieved. This allows a drinking-water installation that complies with the regulations EN 806-5, VDI 6023 and the WHO guidelines.

The invention claimed is:

1. A system for flushing a drinking-water installation, said system comprising at least one riser or distribution pipe, a plurality of branch pipes connected to the riser or distribution pipe, consumer devices and flushing stations connected to the branch pipes, and measuring devices, wherein each of the measuring devices is provided at a location selected from the group consisting of a flushing station and a consumer device, wherein each of said measuring devices is configured to measure a quantity selected from the group consisting of temperature change in the branch pipe and through-flow through the branch pipe wherein the system further comprises a control unit that is connected to the measuring devices by data cables or by radio, wherein the control unit has an evaluation module for evaluating data, said data having been transmitted by the measuring devices, and wherein the evaluation module is set up to determine, on the basis of the data, how many flushing stations need to be flushed simultaneously in order for the riser or distribution pipe to be flushed.

2. The system of claim 1, wherein the least one riser or distribution pipe is one of a plurality of risers or distribution pipes for the feed flow and return flow of a hot water pipe and a cold water pipe, and wherein the risers or distribution pipes have larger diameters than the branch pipes.

3. The system of claim 2, wherein each flushing station is assigned an ID and, on the basis of the ID, the branch pipe associated with the flushing station is able to be identified and the location of the flushing station in the system is able to be identified.

4. The system of claim 1, wherein each flushing station is assigned an ID for identifying the branch pipe to which the flushing station is connected.

5. The system of claim 1, wherein the evaluation module is set up to output a notification that identifies which riser or distribution pipe needs to be flushed.

6. The system of claim 1, wherein the control unit comprises a configuration module that determines how many flushing stations are to be flushed depending on the riser or distribution pipe that is to be flushed, wherein said configuration module is configured to accept a setting of a parameter, wherein the parameter is selected from the group consisting of a flushing time, a flushing duration, whether only the hot-water pipe is to be flushed, whether only the cold-water pipe is to be flushed, and whether both the hot water and cold water pipes are to be flushed.

7. The system of claim 1, wherein the evaluation module is set up to initiate flushing of the riser or distribution pipe automatically by simultaneous flushing of the flushing stations.

8. The system of claim 1, wherein the control unit comprises a configuration module that is configured to determine how many flushing stations are to be flushed depending on the riser or distribution pipe to be flushed, wherein the configuration module is further configured to receive a setting that identifies an interval between periodic flushes of the flushing stations that are to be flushed.

9. The system of claim 1, wherein the evaluation module is set up to determine, on the basis of the data, how many flushing stations need to be flushed simultaneously in order to cause turbulent flow in the riser or distribution pipe to be flushed.

10. A method for flushing a drinking-water installation, said method comprising providing a drinking-water installation that comprises at least one riser or distribution pipe, a plurality of branch pipes connected to the riser or distribution pipe, consumer devices and flushing stations connected to the branch pipes, and measuring devices, wherein each of said measuring devices is provided at a location selected from the group consisting of a flushing station and a consumer device, measuring, using each of said measuring devices, data representative of a quantity selected from the group consisting of temperature change in a branch pipe and through-flow through a branch pipe, and, based at least in part on said data, determining how many flushing stations need to be flushed simultaneously in order to flush the riser or distribution pipe.

11. The method of claim 10, further comprising outputting a notification identifying which riser or distribution pipe needs to be flushed.

12. The method of claim 11, further comprising determining how many flushing stations are to be flushed depending on the riser or distribution pipe to be flushed and accepting a manual selection of which of the flushing stations are to be flushed.

13. The method of claim 10, further comprising outputting a notification indicating how many flushing stations are to be flushed depending on the riser or distribution pipe to be flushed and receiving a manually-selected set of flushing stations that are to be flushed.

14. The method of claim 13, further comprising setting a parameter, wherein said parameter is selected from the group consisting of flushing time, flushing duration, flushing for the hot water pipe, flushing for the cold water pipe, flushing once, and flushing in a periodically recurring manner, wherein flushing is initiated by a user of the control unit.

15. The method of claim 10, further comprising automatically flushing a plurality of flushing stations, thereby flushing the riser or distribution pipe.

\* \* \* \* \*